United States Patent [19]

Reed

[11] 3,845,885
[45] Nov. 5, 1974

[54] MANURE SPREADER
[75] Inventor: Edward A. Reed, Galion, Ohio
[73] Assignee: Harsco Corporation, Camp Hill, Pa.
[22] Filed: Dec. 22, 1972
[21] Appl. No.: 317,386

[52] U.S. Cl. .................................. 222/176, 296/56
[51] Int. Cl. ............................................ A01c 15/12
[58] Field of Search ................... 296/56; 105/261 A;
222/176, 178; 239/676

[56] References Cited
UNITED STATES PATENTS
3,632,050   1/1972   Lee ..................................... 239/676

Primary Examiner—Stanley H. Tollberg
Assistant Examiner—John P. Shannon
Attorney, Agent, or Firm—Palmer Fultz

[57] ABSTRACT

A manure spreader of the tractor drawn type characterized by a novel rear manure dispensing gate mechanism adapted to move the gate rearwardly and away from the load during opening thereof thereby decreasing friction imposed on the gate by heavily compacted manure or the like. The gate is further characterized by a double pivot mounting arrangement, located above the body of the machine so as to rigidly support the gate in its up position when the machine is traveling over rough terrain, as well as to accurately guide the gate back to its closed position.

1 Claim, 4 Drawing Figures

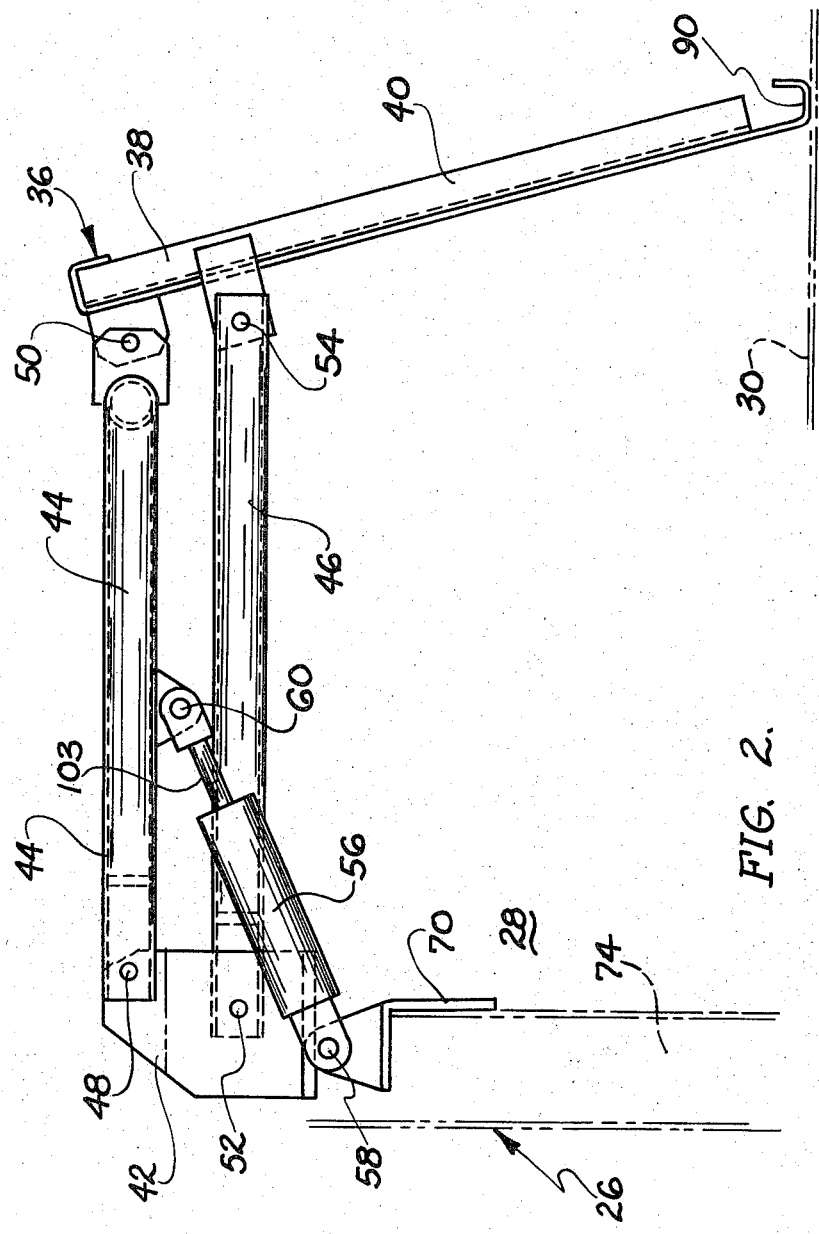
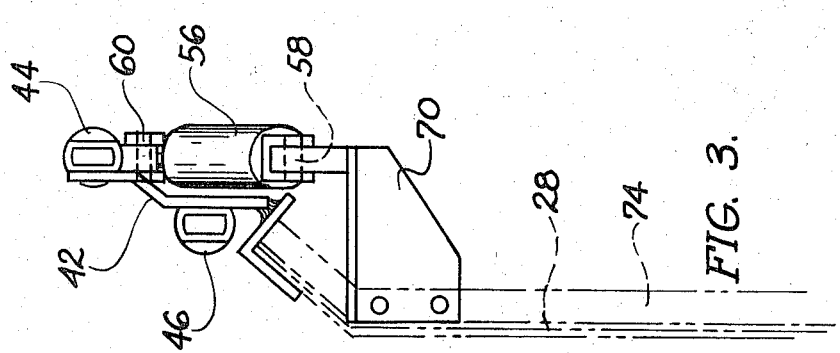

MANURE SPREADER

BACKGROUND OF THE INVENTION

This invention relates to manure spreaders and particularly to a novel material dispensing gate for farm machines of this type.

SUMMARY OF THE INVENTION

In general, the manure spreader of the present invention includes a wheeled frame supporting a body for containing a load of manure or other material to be deposited on a tilled field as the machine is drawn across the ground. The body portion includes a rear opening provided with a manure dispensing gate and a novel gate operating mechanism, the latter serving to move the gate rearwardly away from the compacted load upon opening thereof so as to reduce frictional drag imposed on the gate by said compacted load.

As another aspect of the present invention the above mentioned gate operating mechanism is uniquely mounted on the body at a double pivot arrangement that rigidly supports the gate when the machine is moving over rough and uneven terrain.

As still another aspect of the present invention the double pivot mounting of the gate operating mechanism serves to accurately guide the gate into sealed relationship with the rear opening of the body so as to prevent leakage of the manure during transportation thereof.

It is therefore an object of the present invention to provide an improved manure spreader that includes a novel gate mechanism which operates with decreased frictional drag with respect to the retained load upon opening of the gate to dispense material.

It is another object of the present invention to provide an improved gate mechanism for a manure spreader which gate mechanism is uniquely mounted on the top of the body and hence clear of the load so as to avoid contamination of the mechanism as well as the displacement of usable space within the body of the machine.

It is still another object of the present invention to provide a novel gate operating mechanism for a manure spreader that rigidly supports the gate and accurately guides its position upon opening and closing thereof.

Further objects and advantages of the present invention will be apparent from the following description, reference being had to the accompanying drawings wherein a preferred form of embodiment of the invention is clearly shown.

BRIEF DESCRIPTION OF THE DRAWINGS

FIG. 2 is a partial side elevational view of a gate operating mechanism of the machine of FIG. 1;

FIG. 3 is a partial rear sectional view of the mechanism of FIG. 2; and

DESCRIPTION OF THE PREFERRED EMBODIMENT

Figure 1:
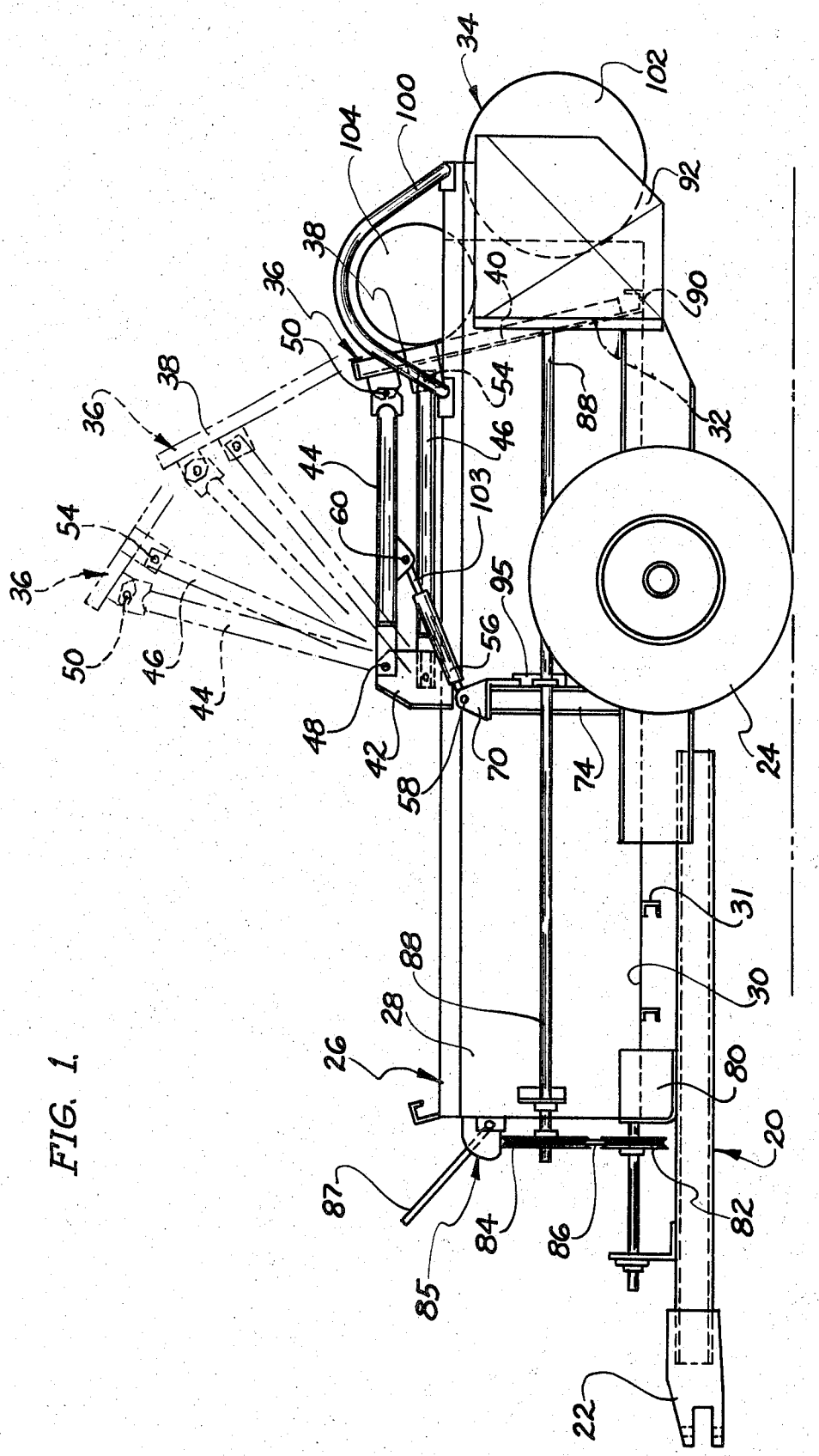
FIG. 1 is a side elevational view of a manure spreader constructed in accordance with the present invention.

Referring in detail to the drawings, a manure spreader constructed in accordance with the present is illustrated in FIG. 1 and includes a wheeled frame indicated generally at 20 provided with a hitch 22 for connection with a tractor and spaced wheels 24.

Frame 20 supports a body means indicated generally at 26 which includes side walls 28 and a bottom wall 30 with the spaced side walls 28 defining a rear dispensing opening from which manure or other materials can be dispensed, in a controlled manner over the surface of a farmer's field.

The dispensing of the fertilizing material is accomplished by the opening of a gate mechanism indicated generally at 36 which normally closes the above mentioned dispensing opening but which when partially raised permits the release of a fertilizing material from beneath a lower edge 90 of a gate member 40.

It should be mentioned that the machine further includes a main beater 102 and top beater 104 which are in general driven by a power train including shaft 88 and pulleys 84 and 86 which are mounted on the side of the frame and adapted for connection in a conventional manner with the power take off unit of the tractor.

It will also be understood that a shaft assembly 85 including an operating handle 87 are mounted on the forward portion of the frame as seen in FIG. 1 and provide control means for the beater assembly in a conventional manner.

Figure 4:
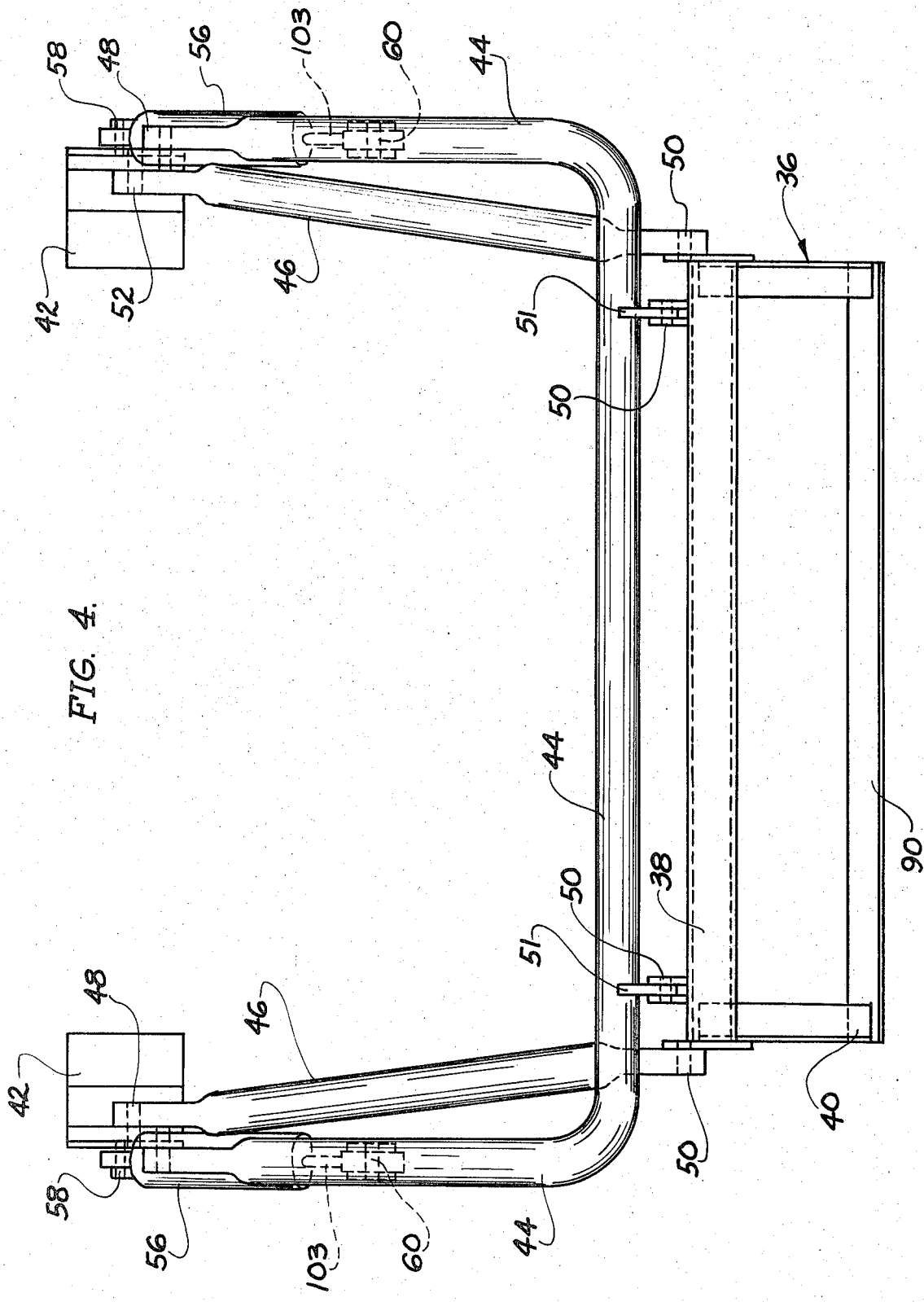
FIG. 4 is a rear elevational view of the gate operating mechanism of FIG. 2.

Reference is next made to FIGS. 2–4 which illustrate in enlarged relationship the novel gate mechanism 36 which includes the previously mentioned gate member 40. The gate member 40 is mounted on a unique linkage, positioned above body means 26, and hence out of contact with the fertilizing material, by an upper arm 44 and a lower arm 46. Each linkage further includes an arm mounting bracket 42 supported on the upper edge of body means 26 with upper arm 44 including pivotal connections 48 and 50 with brackets 42 and gate 40 respectively.

As is best seen in FIG. 2, a lower arm 46 is connected to bracket 42 at pivot 52 and the outer end of such arm is pivotally connected to the gate member at a pivot 54.

At this point it should be mentioned that the length of upper arm 44, between its pivots 48 and 50, is less than the corresponding distance between the pivots 52 and 54 of lower arm 46. Such difference in arm length is provided so that the mounting linkage will cause gate member 40 to swing away from the fertilizing material upon opening of the gate member so as to greatly reduce the friction imposed on the gate member by the load.

With continued reference to FIGS. 2–4, the gate mechanism 36 is actuated by power cylinders 56 each of which include a base pivot 58 mounted on body means 26 at the vertical channel 74 forming a portion of the frame of the body means. Each of the power cylinders further includes an extendable and retractable ram 103 pivotally connected to a respective upper arm 44 at a pivotal connection 60.

It will now be understood that when power cylinders 56 are energized by the delivery of hydraulic fluid from the pump on the tractor such cylinders will extend rams 103 and thereby swing the gate mechanism to the open positions indicated in dotted delineation in FIG. 1.

It will be understood that the hydraulic system for energizing and de-energizing power cylinders 56 includes a control valve of the conventional type mounted on the tractor so that the gate mechanism 36 can be actuated remotely by the driver of the tractor.

While the form of embodiment of the present invention as herein disclosed constitutes a preferred form, it is to be understood that other forms might be adopted.

What is claimed is:

1. A manure spreader comprising, in combination, a wheeled frame, body means on said frame and including side walls, a bottom wall, and a rear dispensing opening, beater means on said frame means rearwardly of said dispensing opening for discharging loaded material from said dispensing opening, arm mounting bracket means extending upwardly to a level above said side walls, an improved gate mechanism for said dispensing opening comprising arm means including a lower arm member provided with a lower forward arm member pivot means on said bracket means and a rear lower arm member pivot means, an upper arm member including a forward upper arm member pivot means on said bracket means and a rear upper arm member pivot means, said upper arm member being shorter in length between its pivot means than the length of said lower arm member between its pivot means, a gate including an upper gate portion pivoted on said last mentioned lower and upper arm member pivot means, respectively, and a lower gate portion normally disposed in sealed engagement with said bottom wall at said dispensing opening, and power means pivoting said arm means to open and close said dispensing opening, said arm members and pivot means forming a linkage for moving said gate rearwardly and upwardly so as to free said gate from the loaded material, both of said arm members being normally positioned at a level above said side walls when said gate is in a closed position.

* * * * *